(12) United States Patent
Methe et al.

(10) Patent No.: US 9,400,386 B2
(45) Date of Patent: Jul. 26, 2016

(54) HEAD-UP DISPLAY HAVING AN IMAGE-GENERATING DEVICE FOR GENERATING AN IMAGE AND OPTICAL SYSTEM FOR PROJECTING THE IMAGE

(75) Inventors: Walter Methe, Bad Woerishofen (DE); Felix Linke, Munich (DE); Peter Pogany, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 607 days.

(21) Appl. No.: 12/717,552

(22) Filed: Mar. 4, 2010

(65) Prior Publication Data
US 2010/0225833 A1    Sep. 9, 2010

(30) Foreign Application Priority Data
Mar. 5, 2009   (DE) .................... 10 2009 011 908

(51) Int. Cl.
*G02B 27/01* (2006.01)
(52) U.S. Cl.
CPC .... *G02B 27/0101* (2013.01); *G02B 2027/0112* (2013.01); *G02B 2027/0118* (2013.01)
(58) Field of Classification Search
USPC ......................................................... 349/11
See application file for complete search history.

(56) References Cited

U.S. PATENT DOCUMENTS

| 3,679,297 | A | 7/1972 | Searle et al. |
| 7,034,778 | B1 | 4/2006 | Haehl |
| 2007/0274102 | A1 | 11/2007 | Bohme et al. |
| 2008/0198593 | A1 | 8/2008 | Breinich et al. |
| 2008/0285139 | A1* | 11/2008 | Chen ............................. 359/630 |

FOREIGN PATENT DOCUMENTS

| DE | 2 009 200 | | 9/1970 |
| DE | 101 49 837 | A1 | 5/2003 |
| DE | 103 44 686 | A1 | 5/2005 |
| DE | 10 2004 013 680 | A1 | 10/2005 |
| DE | 10 2005 020 233 | A1 | 11/2006 |
| DE | 10 2006 005 571 | A1 | 8/2007 |
| DE | 10 2006 014 394 | A1 | 10/2007 |
| EP | 1 143 288 | A1 | 10/2001 |

OTHER PUBLICATIONS

German Search Report dated Jun. 3, 2009 including partial English translation (Nine (9) pages).

* cited by examiner

*Primary Examiner* — Lauren Nguyen
(74) *Attorney, Agent, or Firm* — Crowell & Moring LLP

(57) ABSTRACT

A head-up display includes an image-generating device for generating an image and an optical system for projecting the image onto a windshield of a vehicle. A lighting system illuminates the image-generating device. The lighting system includes at least one light source, downstream of which a light-mixing geometry is disposed. The light-mixing geometry has boundary surfaces, each of which has light-reflecting inner sides, in order to homogenize the light of the at least one light source.

16 Claims, 4 Drawing Sheets

HEAD-UP DISPLAY HAVING AN IMAGE-GENERATING DEVICE FOR GENERATING AN IMAGE AND OPTICAL SYSTEM FOR PROJECTING THE IMAGE

CROSS-REFERENCE TO RELATED APPLICATIONS

This application claims priority under 35 U.S.C. §119 from German Patent Application No. DE 10 2009 011 908.6, filed Mar. 5, 2009, the entire disclosure of which is herein expressly incorporated by reference.

BACKGROUND AND SUMMARY OF THE INVENTION

The invention relates to a head-up display, particularly a head-up display for vehicles, and a vehicle including a corresponding head-up display.

Many different types of display devices are known from the prior art relating to the motor-vehicle sector, in particular. Special emphasis is placed on so-called head-up displays (HUD) in current developmental efforts.

Such head-up displays are disclosed in DE 10 344 686 A1 and EP 1 143 288 A1 by way of example. Light from a backlight device is deflected onto an image-generating device such as a liquid crystal display, and the image thus generated is projected onto the windshield of a vehicle by use of an imaging device.

The head-up display optical system must be designed such that drivers, both tall and short, can see the image in its entirety and with homogeneous brightness. The region, within which the HUD image can be seen in its entirety, is called the "eyebox". The size of the eyebox is determined by the apertures of the imaging optics and diaphragms disposed between the display and the disk. The impression of homogeneity (in terms of color and brightness) within this eyebox is determined by the backlight unit.

In order to enable a driver to read the HUD image with sufficient brightness in all environmental conditions, the maximum possible light yield must be achieved. Head-up displays known from the prior art convert approximately 0.005% of the electrical energy used into light visible to the driver. Sufficient image brightness cannot be achieved for all street settings with the aid of the current state of the art. In the case of light power, the fluctuations of current systems with respect to the light yield additionally require a safety margin of 20%.

Consequently, the following requirements are placed on a backlight unit of a head-up display:
  homogeneous image impression (color and brightness);
  high light efficiency; and
  low sensitivity with respect to positioning variations of the light sources, particularly LEDs, relative to the optical units.

A suggested head-up display HUD shown in FIG. 3 includes a plurality of light-emitting diodes Dr, Dg, one portion of which emits green light and the other red. The LED radiation is collimated by lens and/or reflector arrays L. The green and the red beams are merged by a dichroitic mirror DS and scattered homogeneously by a diffuser S.

The homogeneous scattering angle range of the diffuser S is selected such that light is scattered from the uppermost pixel of the display LCD disposed downstream into the lowermost point of the eyebox EB. However, light beams scattered from the uppermost pixel of the display LCD upward into the region "a" are not deflected into the eyebox EB. These beams fall on non-transparent HUD components (housing, diaphragms . . . ) and are absorbed, or they create light reflections that are disturbing to the driver. Likewise, light emitted by the light sources laterally, for example, into the region b, is lost in a similar manner.

Furthermore, FIG. 3 shows light beams "c," "d" resulting from an inaccurately positioned LED. The light beams in the region c do not fall on the LCD and thus cannot be used for imaging. Fewer light beams fall in the region d, thus giving rise to illumination inhomogeneities.

Backlight units known from the prior art offer no solution to these problems. In head-up displays produced so far, only a portion of the LCD surface and/or a portion of the eyebox is backlit by an LED. The tolerances of the individual light sources must be compensated in relation to each other with respect to brightness and direction of radiation. Collimating optics such as lens and/or reflector arrays require high production and positioning accuracy, particularly in the border region between the light sources. This will become clear from the example of lens homogeneities with reference to FIGS. 4 and 5. The figures each show diodes D, collimating optics L and a diffuser S. Even small lens inhomogeneities deviating from the theoretical value result in an inhomogeneous light-intensity distribution of the backlight. Small tolerances/deviations cause illumination inhomogenenities such as visible honeycomb structures that are disturbing to the driver. Improvements in homogeneity by means of stronger diffusers that scatter light in a larger solid angle range can only be achieved at the expense of light efficiency.

The object underlying the invention is to provide a homogeneous and efficient backlighting of the image-generating device of a head-up display with respect to brightness and/or color.

This object is achieved by a head-up display including an image-generating device for generating an image, and an optical system for projecting the image onto a windshield of a vehicle. A lighting system is provided for illuminating the image-generating device. The lighting system includes one or more light sources, and a light-mixing geometry is disposed downstream of each of the light sources particularly in the optical direction (for example, in the direction of light propagation or the main direction of light propagation). The light-mixing geometry has boundary surfaces, each of which is reflective on the inner side, in order to mix and/or homogenize the light of the corresponding light sources. The surface normal to the boundary surfaces is preferably oriented orthogonal to the main radiation direction of the plurality of light sources.

As a result of the use of the light-mixing geometry, the light falling on components disposed downstream of the light-mixing geometry, such as a diffuser, has substantially homogeneous brightness and/or chromaticity over the surface of these components.

The head-up display requires a simple production process since the positional tolerances of the light-mixing geometry can be large in relation to the light sources. The production tolerances of the light-mixing geometry per se can also be large.

An additional advantage of the invention consists in the efficient use of the light power provided by the light sources. This is because the light-mixing geometry disposed downstream also enables the light beams emitted laterally from the light sources to be deflected directly or indirectly onto the image-generating device.

The plurality of light sources preferably includes LEDs emitting light of various colors such as red and green. In this case, the light-mixing geometry enables the generation of an image having brilliant and/or saturated colors. The LEDs of various colors can be activated simultaneously or alternately.

It is also within the scope of the present invention to provide a light-mixing geometry downstream of each of several light sources disposed side by side, in particular. It is likewise within the scope of the invention to provide a light-mixing geometry downstream of each of several groups (pluralities) of light sources disposed side by side, in particular.

The image-generating device preferably comprises a display such as an LCD or a DMD (Digital Mirror Display). For generating an image, the image-generating device is illuminated or backlit by the lighting system, preferably transmissively or reflectively.

In an improvement of the invention, light is radiated into the rear side of the light-mixing geometry by at least one light source or the plurality of light sources, the light is homogenized and/or mixed by multiple reflections on the reflecting boundary surfaces, and the homogenized and/or mixed light exits from the front side of the light-mixing geometry.

The lighting system preferably comprises a diffuser, particularly a diffusion disk, which is disposed downstream of the light-mixing geometry, particularly in the optical direction, such that the light exiting from the light-mixing geometry is scattered through the diffuser.

The diffuser homogenizes the angular distribution of the light beams exiting from the light-mixing geometry and having homogenous brightness and chromaticity as mentioned above. This prevents the light-source structures from becoming visible from the eyebox.

The lighting system preferably comprises a condenser system, particularly a condenser lens or a condenser mirror, which is disposed downstream of the light-mixing geometry and/or the diffuser, particularly in the optical direction, such that the mixed, homogenized and/or scattered light is deflected onto the image-generating device and projected onto the windshield and finally imaged in the eyebox. The condenser system is preferably formed such that the diffuser plane is imaged in the eyebox. A high light yield is thus achieved and the light originating from the light source(s) is efficiently used for image generation. The focal length of the condenser system is preferably in the range of 20 mm to 200 mm.

The combination of light source(s), light-mixing geometry, diffuser and condenser system is formed such that the entire surface of the image-generating device is illuminated homogeneously by the beams of each individual light source or group of light sources. This can prevent or reduce the tolerance problems discussed above. This also results in a homogeneous image impression inside the eyebox from any position.

The optical system for reproducing the image, particularly on a windshield of a vehicle, is disposed downstream of the image-generating device, particularly in the optical direction.

The light-mixing geometry preferably has a polygonal, particularly a rectangular, cross-section. Extensive tests have shown that this kind of a cross-section enables particularly effective light homogenization or light mixing. For mixing the light of different light sources, it has proved to be particularly effective if the length $L$ of the light-mixing geometry from the rear side (or light-entry side) to the front side (or light-exit side) is at least as large as the distance $A$ of those light sources in the plurality of light sources having the maximum distance from each other ($L>A$). On the other hand, it is important particularly in vehicles to keep the HUD installation space small. Extensive tests have shown that a HUD of the invention can be integrated into a vehicle with particular ease if the following equation applies: $L<3A$. Therefore, the following equation holds true in an improvement of the invention: $A<L<3A$.

According to an advantageous improvement of the invention, the light-mixing geometry comprises a fiber-optic light guide, into which the light of the light source(s) is coupled from the rear side of the fiber-optic light guide. Particularly, the lateral border surfaces of the light guide then act as (totally) reflecting inner sides for the light guided in the fiber-optic light guide.

Alternately or additionally, the light-mixing geometry preferably comprises a hollow channel (or a hollow tube), the surfaces delimiting the channel being formed with light-reflecting, particularly mirrored, inner sides.

A vehicle including one of the head-up displays cited above, in which the image generated by the head-up display is projected onto a windshield or onto an additionally inserted, mostly transparent projection disk of the vehicle, is also within the scope of the present invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
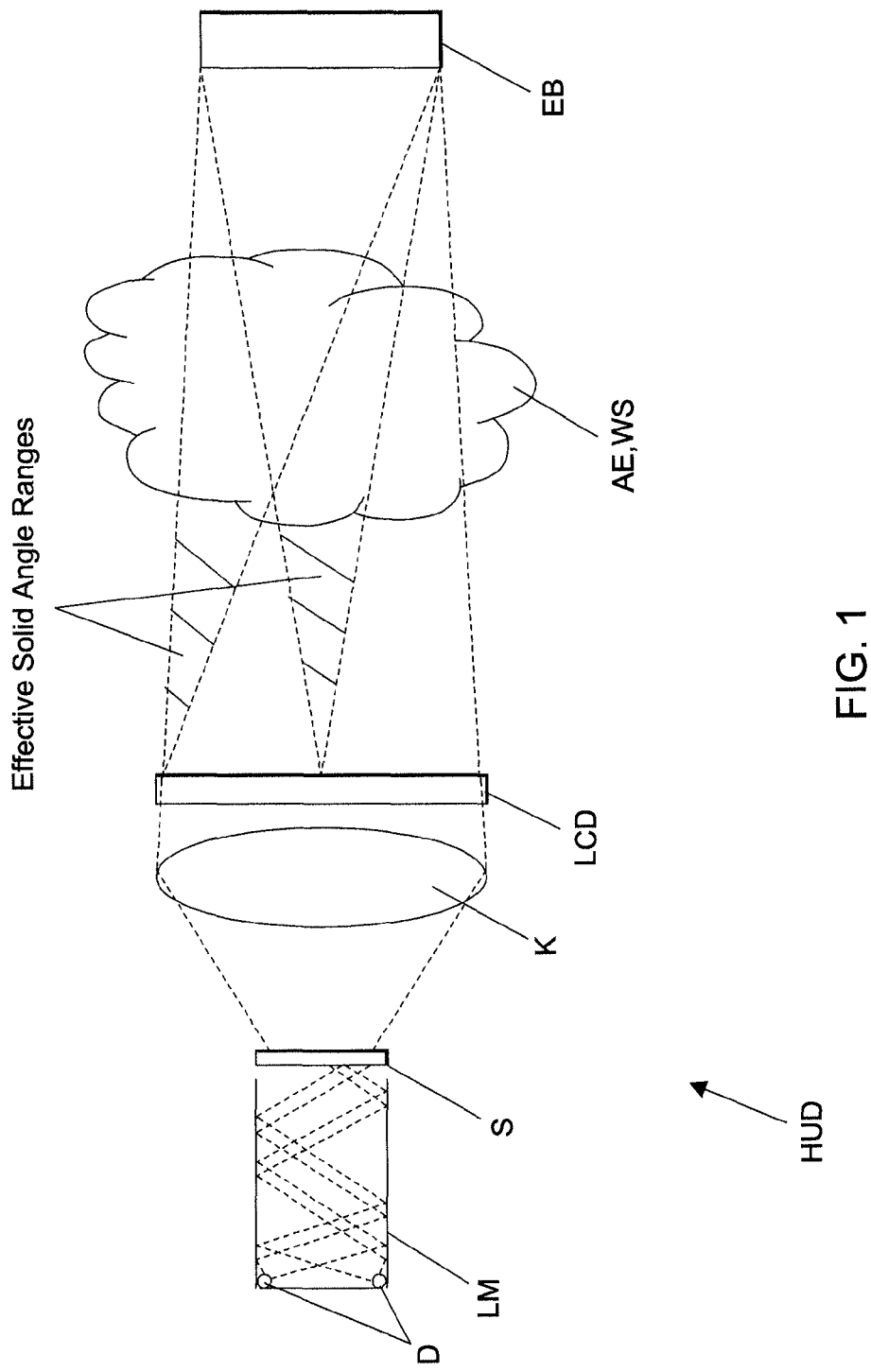
FIG. 1 is a schematic sectional representation of a head-up display comprising a condenser lens.

The head-up display HUD shown in FIG. 1 includes one or more light-emitting diodes D, a part of which emits green light and the other part of which emits red light.

The light emitted by the light-emitting diodes D enters into the light-mixing geometry LM from the rear side thereof, which is formed here as a light channel or a light box. For this purpose, an LED board supporting the light-emitting diodes D substantially covers the rear side, particularly the rear-sided opening, of the light-mixing geometry LM.

In particular, the lateral inner surfaces of the light channel LM are formed such that they are light-reflecting, particularly mirrored, so that light of the light-emitting diodes fed into the rear side of the light channel is guided inside the same from the rear toward the front side, particularly the front-sided light-exit side almost without any light loss. The multiple reflections of the light beams occurring on the inner sides of the light channel result in an almost complete mixture of the green and red light of the green and red light-emitting diodes D to form yellow light.

The yellow light exits from the front side of the light-mixing geometry LM and falls on a diffusion disk S, which directly adjoins the light-mixing geometry and by which the light is scattered.

The light mixed by the light-mixing geometry LM and scattered by the diffusion disk S falls on an appropriately positioned condenser lens K that deflects the light onto the image-generating device LCD.

The image, which is generated by the image-generating device LCD based on the light deflected onto the same, is projected in the known manner onto the windshield WS of a vehicle with the aid of a known imaging device AE such as an optical system comprising mirrors and/or lenses. This image becomes clearly visible to the driver of the vehicle out of a so-called eyebox EB.

Apart from the components explained above, the head-up display illustrated can comprise additional components typical of a head-up display such as various filters, imaging optics, a housing, and control devices, etc., which have not been described in detail merely for the sake of simplicity.

Figure 2:
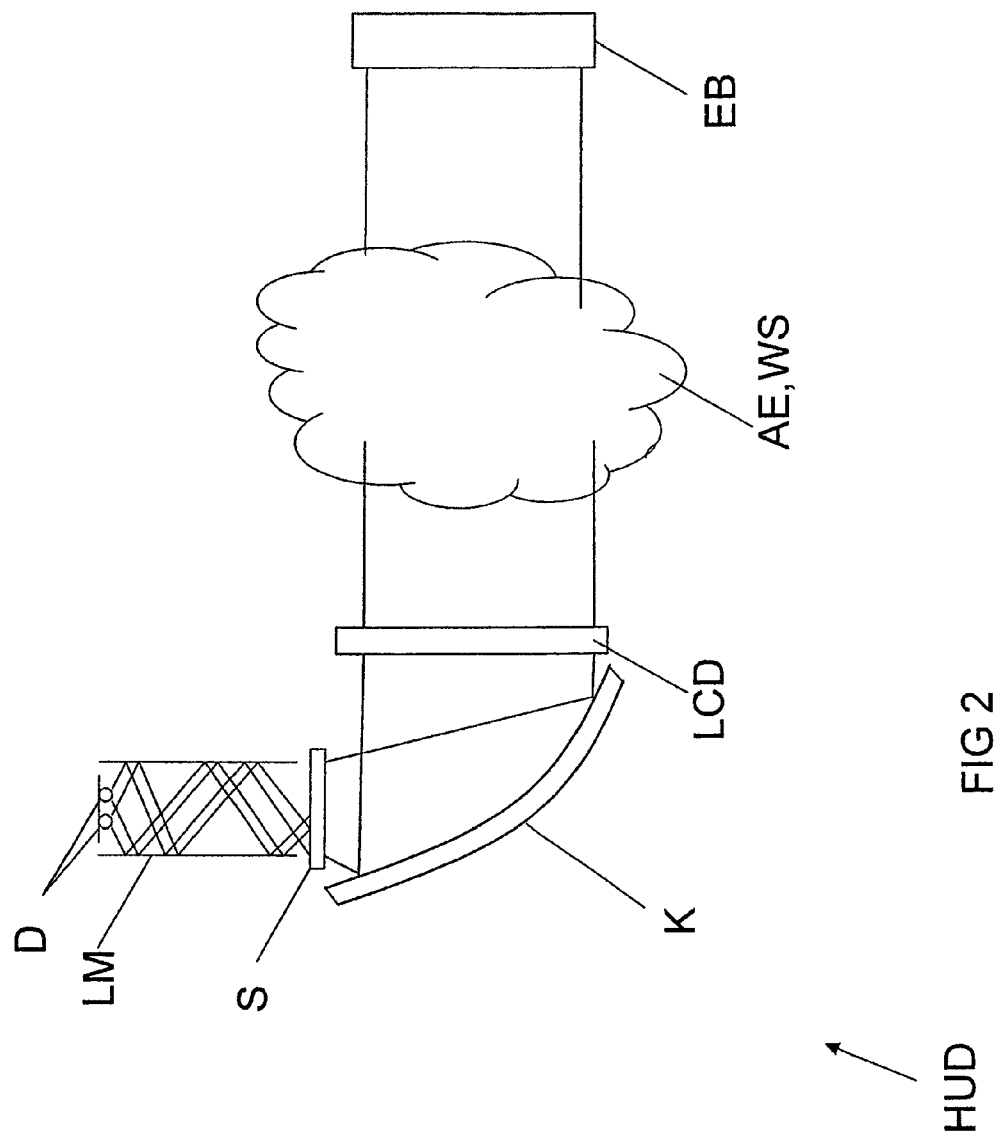
FIG. 2 is a schematic sectional representation of a head-up display comprising a condenser mirror.
Figure 3:
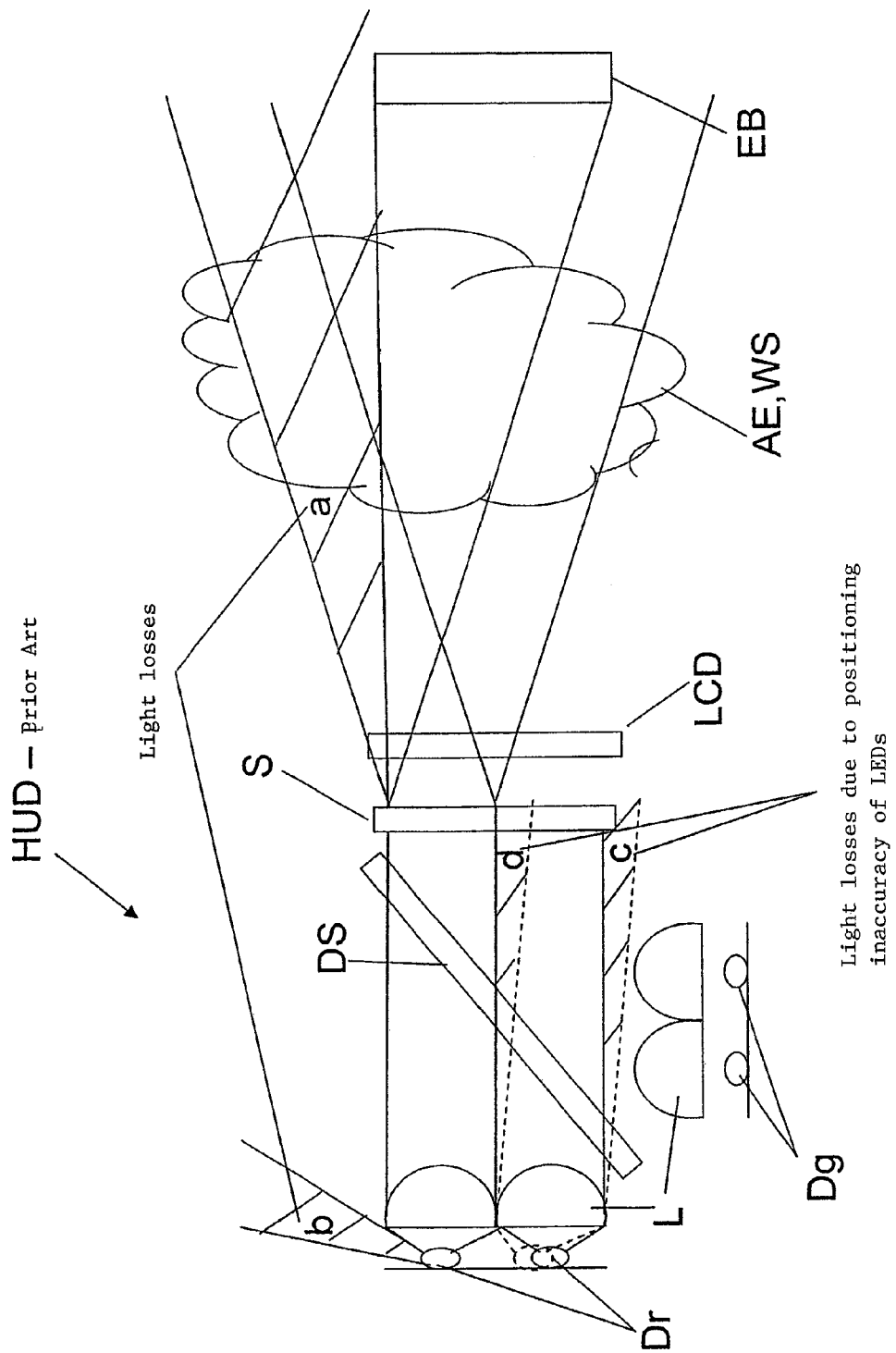
FIG. 3 is a schematic sectional representation of a head-up display known from the prior art.
Figure 5:
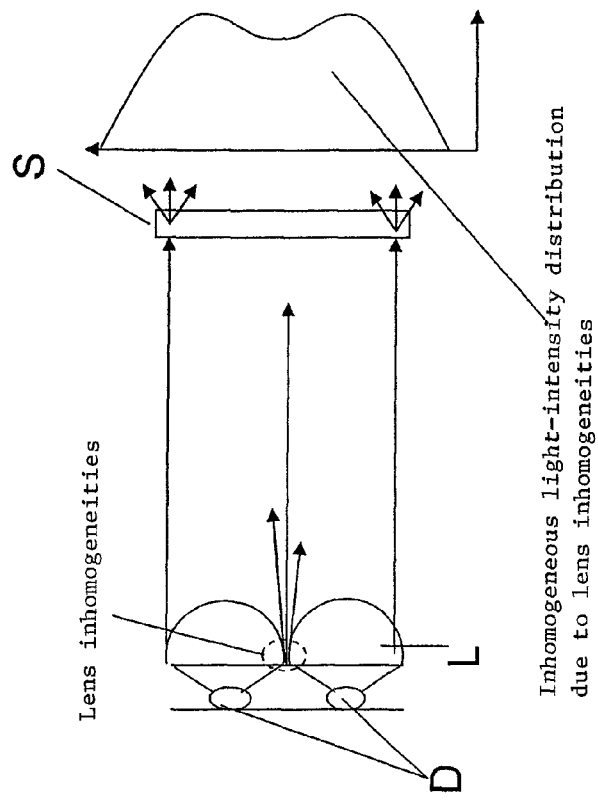
FIGS. 4 and 5 illustrate light-intensity distributions known from the prior art.
Figure 4:
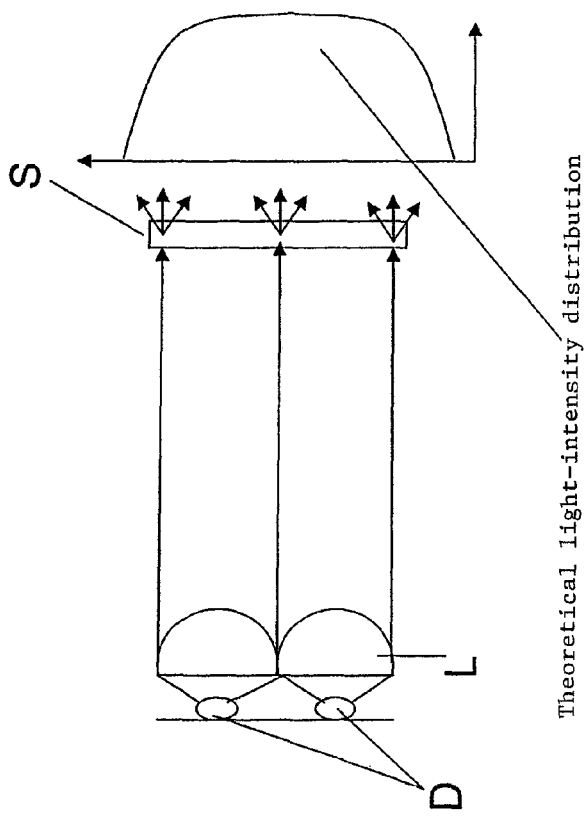

FIG. 2 shows a head-up display HUD which is similar to the one explained with reference to FIG. 1 and in which the condenser lens is replaced with a condenser mirror K.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head-up display, comprising:
   an image-generating device for generating an image and an optical system operatively configured for projecting the image;
   a lighting system configured to illuminate the image-generating device;
   wherein the lighting system comprises at least two different color light sources having a common light propagation path; and
   a light-mixing geometry disposed directly adjacent to and downstream of the at least two different color light sources and along the common light propagation path, wherein the light-mixing geometry has boundary surfaces, each of which is reflective on an inner side, and wherein the light-mixing geometry is configured to mix together and homogenize the light of the at least two different color light sources, wherein the lighting system further comprises a diffuser that is disposed downstream from and directly adjacent to the light-mixing geometry, wherein a length of the light-mixing geometry along the common light propagation path is (i) greater than a distance between the at least two different color light sources, and (ii) less than three times said distance between the at least two different color light sources.

2. The head-up display according to claim 1, wherein the image-generating device comprises an LCD display.

3. The head-up display according to claim 1, wherein the image-generating device is illuminated by the lighting system transmissively or reflectively for generating the image.

4. The head-up display according to claim 2, wherein the image-generating device is illuminated by the lighting system transmissively or reflectively for generating the image.

5. The head-up display according to claim 1, wherein light is radiated into a rear side of the light-mixing geometry by said at least two different color light sources, said light being homogenized by reflections on the reflecting boundary surfaces, and the homogenized light exiting from a front side of the light-mixing geometry.

6. The head-up display according to claim 1, wherein the lighting system comprises a condenser system, which is disposed downstream of at least one of the light-mixing geometry and the diffuser such that at least one of the homogenized light and scattered light is deflected onto the image-generating device.

7. The head-up display according to claim 1, wherein the optical system is disposed downstream of the image-generating device for reproducing an image.

8. The head-up display according to claim 7, wherein the image is reproduced on a windshield of a vehicle.

9. The head-up display according to claim 1, wherein the optical system projects the image onto a windshield of a vehicle.

10. The head-up display according to claim 1, wherein the light-mixing geometry has a polygonal cross-section.

11. The head-up display according to claim 10, wherein the polygonal cross-section is a rectangular cross-section.

12. The head-up display according to claim 1, wherein the light-mixing geometry comprises a fiber-optic light guide, into which light of the at least one light source is coupled from the rear side of the fiber-optic light guide.

13. The head-up display according to claim 1, wherein the light-mixing geometry comprises a hollow channel, surfaces delimiting the hollow channel being formed with light-reflecting inner sides.

14. The head-up display according to claim 13, wherein the light-reflecting inner sides of the hollow channel are mirrored surfaces.

15. A vehicle, comprising:
    a windshield;
    a head-up display, the head-up display comprising:
       an image-generating device for generating an image and an optical system operatively configured for projecting the image onto the windshield of the vehicle;
       a lighting system configured to illuminate the image-generating device;
       wherein the lighting system comprises at least two different color light sources having a common light propagation path; and
       a light-mixing geometry disposed directly adjacent to and downstream of the at least two different color light sources and along the common light propagation path, wherein the light-mixing geometry has boundary surfaces, each of which is reflective on an inner side, and wherein the light-mixing geometry is configured to mix together and homogenize the light of the at least two different color light sources, wherein the lighting system further comprises a diffuser that is disposed downstream from and directly adjacent to the light-mixing geometry, wherein a length of the light-mixing geometry along the common light propagation path is (i) greater than a distance between the at least two different color light sources, and (ii) less than three times said distance between the at least two different color light sources.

16. A head-up display, comprising:
    an image-generating device for generating an image and an optical system operatively configured for projecting the image;
    a lighting system configured to illuminate the image-generating device;
    wherein the lighting system comprises at least two different color light sources having a common light propagation path; and
    a light-mixing means for mixing together and homogenizing the light of the at least two different color light sources, wherein the light-mixing means is disposed directly adjacent to and downstream of the at least two different color light sources and along the common light propagation path, wherein the lighting system further comprises a diffuser that is disposed downstream from and directly adjacent to the light-mixing geometry, wherein a length of the light-mixing geometry along the common light propagation path is (i) greater than a distance between the at least two different color light sources, and (ii) less than three times said distance between the at least two different color light sources.

* * * * *